United States Patent
Jenski, Jr.

(10) Patent No.: US 11,619,332 B2
(45) Date of Patent: Apr. 4, 2023

(54) QUICK DISCONNECT FITTING

(71) Applicant: Eaton Intelligent Power Limited, Dublin (IE)

(72) Inventor: Gary M. Jenski, Jr., Jackson, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 23 days.

(21) Appl. No.: 17/169,755

(22) Filed: Feb. 8, 2021

(65) Prior Publication Data

US 2021/0254769 A1 Aug. 19, 2021

Related U.S. Application Data

(60) Provisional application No. 62/975,821, filed on Feb. 13, 2020.

(51) Int. Cl.
*F16L 29/04* (2006.01)
*F16L 37/34* (2006.01)
*F16L 37/23* (2006.01)

(52) U.S. Cl.
CPC ............ *F16L 29/04* (2013.01); *F16L 37/23* (2013.01); *F16L 37/34* (2013.01)

(58) Field of Classification Search
CPC .......... F16L 29/04; F16L 37/35; F16L 37/34; F16L 37/23; F16L 37/36
See application file for complete search history.

(56) References Cited

U.S. PATENT DOCUMENTS

| | | | | | |
|---|---|---|---|---|---|
| 2,254,997 | A | * | 9/1941 | Fisher | F16L 29/04 188/140 R |
| 2,391,022 | A | * | 12/1945 | Main | F16L 29/04 251/149.4 |
| 2,451,441 | A | * | 10/1948 | Main, Jr. | F16L 29/04 137/614.04 |
| 2,456,045 | A | * | 12/1948 | Brock | F16L 29/04 137/614.03 |

(Continued)

FOREIGN PATENT DOCUMENTS

| | | | | | |
|---|---|---|---|---|---|
| GB | 2112094 | A | * | 7/1983 | F16L 37/23 |
| GB | 2 230 070 | A | | 10/1990 | |

OTHER PUBLICATIONS

French Preliminary Search Report for Application No. FR2101390 dated Aug. 18, 2022 (17 pages).

*Primary Examiner* — David Colon-Morales
(74) *Attorney, Agent, or Firm* — Merchant & Gould P.C.

(57) ABSTRACT

A fluid coupling may comprise a first assembly, a second assembly and a retainer. The first assembly may include first ratchet teeth and a body with external threads. The second assembly may include second ratchet teeth and a nut with internal threads. The second ratchet teeth may be configured to engage the first ratchet teeth. The internal threads may be configured to engage the external threads. The retainer may include at least one floating lobe configured to be positioned between the external and internal threads. At least one floating lobe may include first and second lobes, which may have a semi-circular structure and may be configured in a ring configuration. In embodiments, the second assembly includes a valve sleeve; a seal is disposed between the body and valve sleeve; and, upon connection, a sealing surface angle is provided between a portion of the body and a portion of the sleeve.

32 Claims, 10 Drawing Sheets

(56) References Cited

U.S. PATENT DOCUMENTS

| | | | | | |
|---|---|---|---|---|---|
| 2,485,006 | A | * | 10/1949 | Main, Jr. | F16L 29/04 137/614.03 |
| 2,491,406 | A | * | 12/1949 | Zeeb | F16L 29/04 411/326 |
| 2,504,569 | A | * | 4/1950 | Murphy | F16L 29/04 137/614.04 |
| 2,709,093 | A | * | 5/1955 | Zeeb | F16L 29/04 285/82 |
| 2,731,058 | A | * | 1/1956 | Smisko | F16L 29/04 285/82 |
| 2,884,981 | A | * | 5/1959 | Wurzburger | F16L 29/04 285/91 |
| 2,931,668 | A | * | 4/1960 | Baley | F16L 29/04 137/614.04 |
| 2,958,544 | A | * | 11/1960 | Wurzburger | F16L 37/34 137/614.03 |
| 3,446,245 | A | * | 5/1969 | Snyder, Jr. | F16L 15/008 285/276 |
| 4,287,914 | A | * | 9/1981 | Buseth | F16L 29/04 137/508 |
| 4,815,495 | A | * | 3/1989 | Remsburg | F16L 37/23 251/126 |
| 5,401,066 | A | * | 3/1995 | Remsburg | F16L 29/04 292/38 |
| 6,176,263 | B1 | * | 1/2001 | Lacroix | F16L 29/04 251/149.6 |
| 7,575,024 | B2 | * | 8/2009 | Zeiber | F16L 29/04 251/149.6 |
| 7,762,279 | B2 | * | 7/2010 | Zeiber | F16L 29/04 251/149.6 |
| 11,137,100 | B2 | * | 10/2021 | Zhang | F16L 29/04 |
| 11,199,283 | B2 | * | 12/2021 | Jenski, Jr. | F16L 37/36 |

\* cited by examiner

QUICK DISCONNECT FITTING

CROSS-REFERENCE TO RELATED APPLICATION

This application claims the benefit of U.S. Provisional Patent Application Ser. No. 62/975,821, filed Feb. 13, 2020, the disclosure of which is hereby incorporated by reference in its entirety as though fully set forth herein.

TECHNICAL FIELD

The present disclosure generally relates to fluid fittings or couplings, including thread together quick disconnect couplings.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some fluid fittings, it may be difficult to connect and disconnect a fluid connection. For example, such fluid fittings may require excessive force or be unable to connect in the event of hydraulic lock; can cause a significant pressure drop in cooling, pressurized or closed systems; and may introduce unwanted air and dirt. Typical fluid fittings may result in a difficult and lengthy connection and disconnection process with pressurized or closed systems.

There is a desire for solutions/options that minimize or eliminate one or more challenges or shortcomings of fluid fittings. The foregoing discussion is intended only to illustrate examples of the present field and should not be taken as a disavowal of scope.

SUMMARY

In embodiments, a fluid coupling may comprise a first assembly, a second assembly and a retainer. The first assembly may include first ratchet teeth and a body with external threads. The second assembly may include second ratchet teeth and a nut with internal threads. The second ratchet teeth may be configured to engage the first ratchet teeth. The internal threads may be configured to engage the external threads.

The retainer may include at least one floating lobe configured to be positioned between the external and internal threads. The at least one floating lobe may include first and second lobes. The first and second lobes may have a semi-circular structure. The first and second lobes may be configured to be arranged in a ring configuration.

The body may include a seal and at least one floating lobe is configured to urge the seal against the second assembly. This may, for example, be in response to threading the external and internal threads. The nut may include a thread relief groove with a recess configured to receive at least one floating lobe and urge the at least one floating lobe against the body. The body may include a groove configured to receive the at least one floating lobe and urge at least one floating lobe against the nut.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents.

In embodiments, such as generally illustrated in FIGS. 1-11, a fluid fitting (or fluid coupling) 100 may include a first assembly 102 and a second assembly 104. For example and without limitation, the first assembly 102 (e.g., a male assembly) may generally include one or more structures configured to be received in the second assembly 104, the second assembly 104 (e.g., a female assembly) may generally include one or more structures configured to receive the first assembly 102, or vice versa. The first assembly 102, second assembly 104, or a combination thereof, may be integrally or separately formed with different, fewer or additional structures. The first assembly 102, second assembly 104, or a combination thereof, may be configured to include all or any combination of the components described herein, or any combination of different or additional components. The first assembly 102 and second assembly 104 may be a single assembly or may comprise one or more additional assemblies.

With embodiments, such as generally illustrated in FIGS. 7-11, fitting 100 may include, for example and without limitation, components having structures, functions and methods as described, illustrated, and/or readily understood by an artisan in the field.

Figure 8:
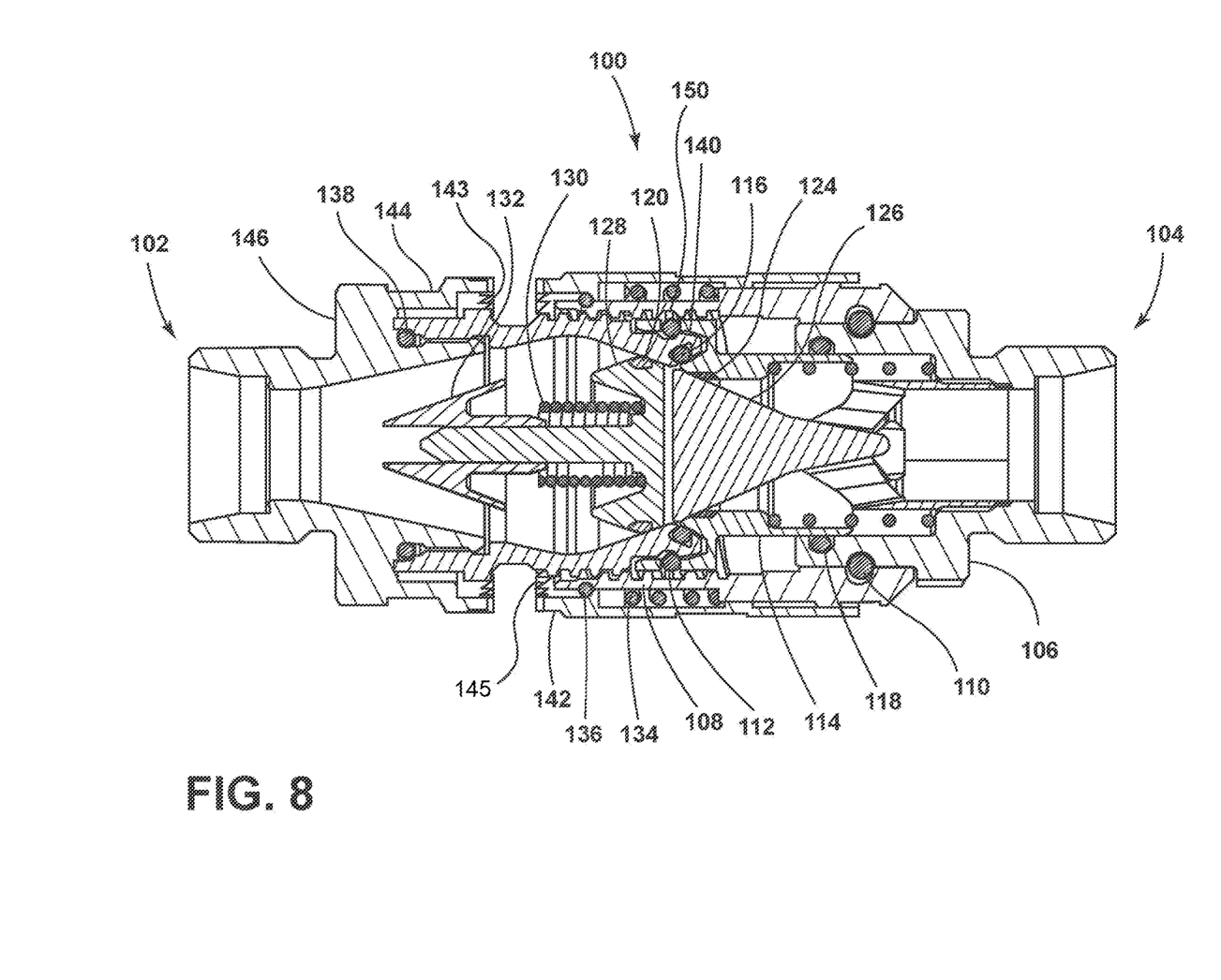
FIG. 8 is a cross-section view of an embodiment of fitting, e.g., in a disconnected configuration.
Figure 9:
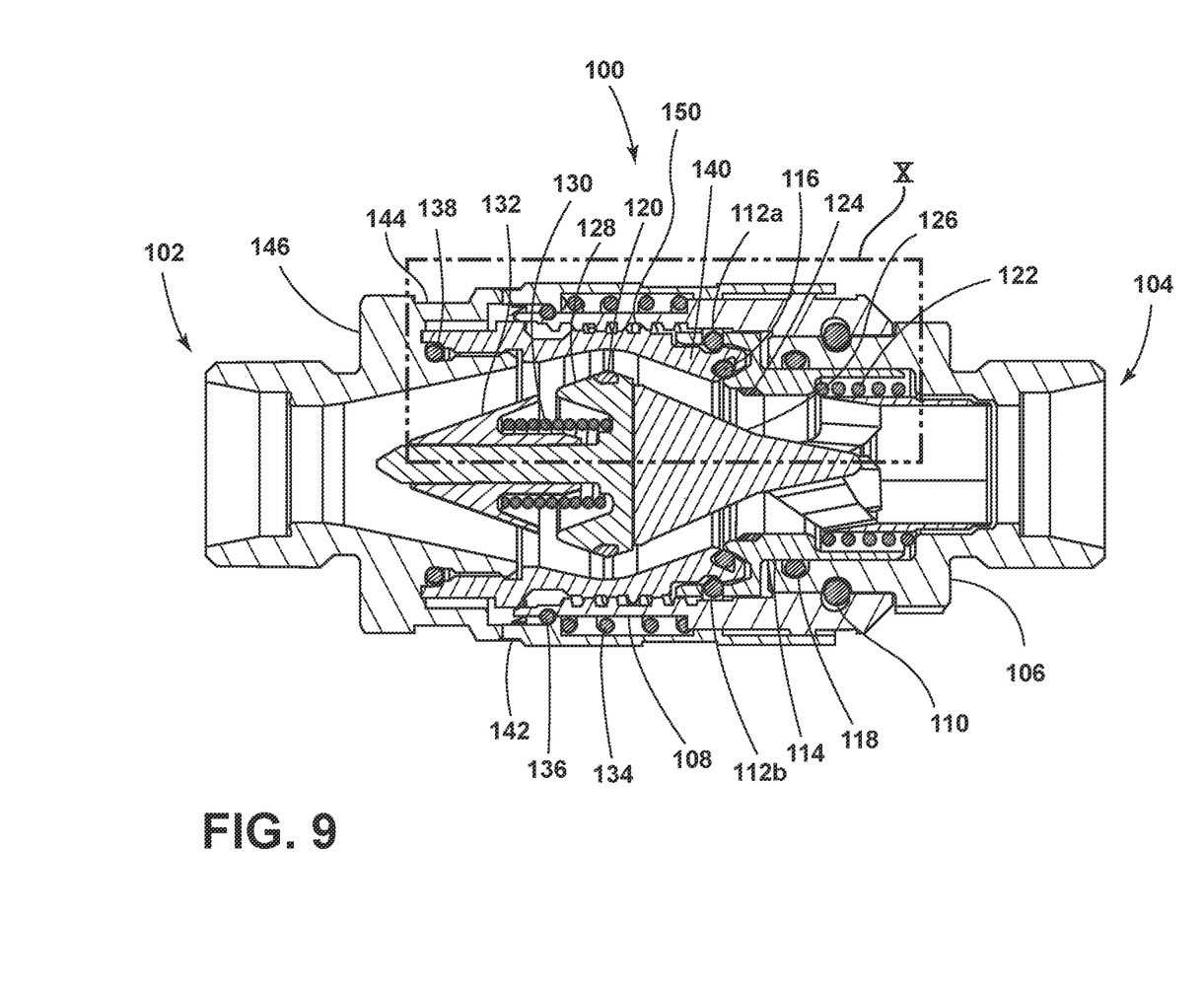
FIG. 9 is a cross-section view of an embodiment of fitting, e.g., in a connected configuration.
Figure 10:
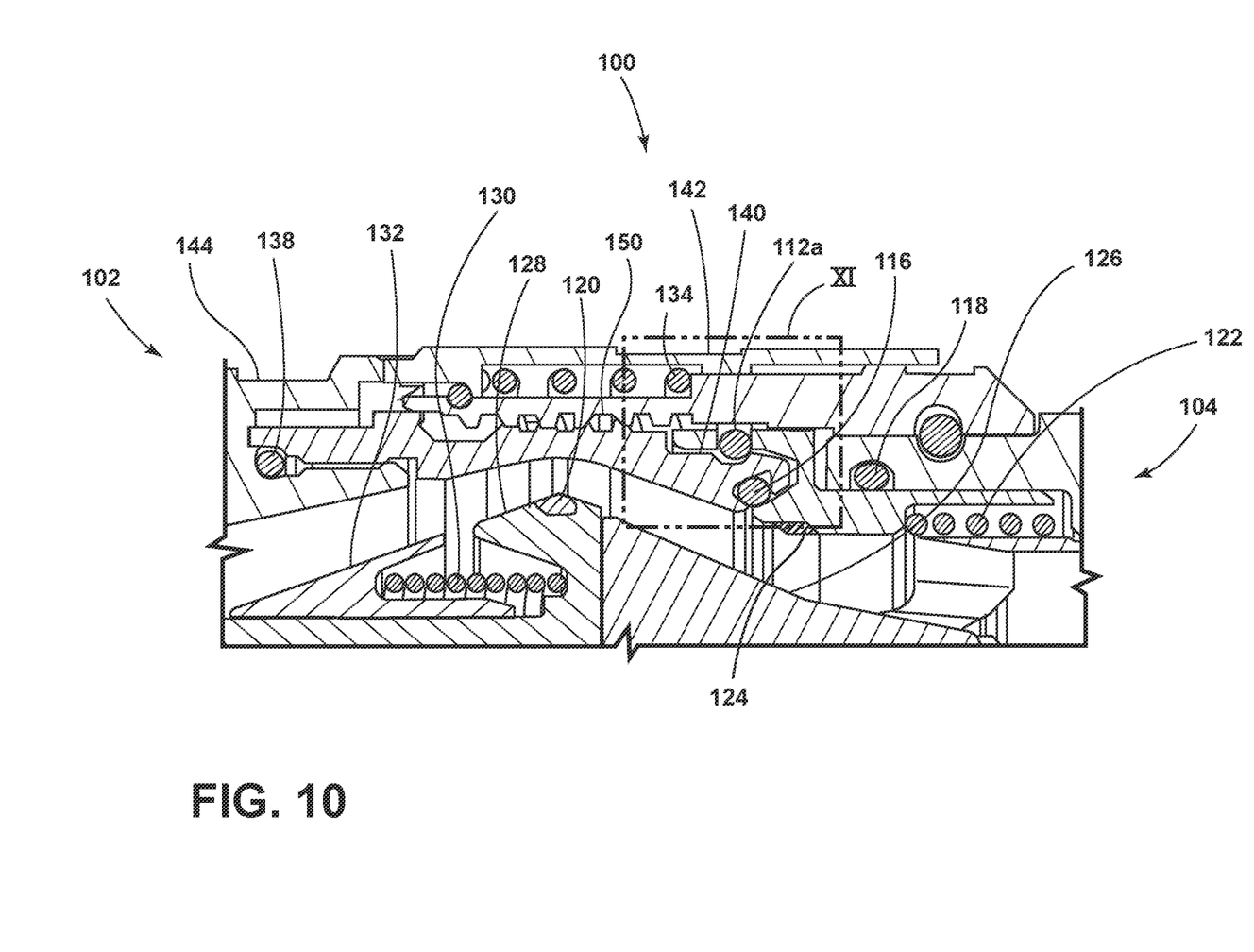
FIG. 10 is an enhanced cross-section view of an embodiment of fitting, e.g., associated with FIG. 9.

As generally illustrated in FIGS. 7-10, fitting 100 may include an adapter 106, nut 108, wire 110, retainer 112, valve sleeve 114, seal 116 (e.g., main seal), seal 118 (e.g., adapter and/or valve sleeve seal), seal 120 (e.g., bonded poppet seal), spring 122 (e.g., valve sleeve spring), seal 124 (e.g., bonded valve sleeve seal), valve 126, poppet valve 128, poppet spring 130, guide 132, release sleeve spring 134, ring 136, seal 138 (e.g., adapter/body seal), body 140, locking sleeve 142, ratchet ring 144, and adapter 146. As generally illustrated in FIG. 10, fitting 100 may include a thread relief groove 150 and a lobe groove 152. Any or all of these components may be interchangeable between the first assembly 102, second assembly 104, or one or more additional assemblies.

With embodiments, fitting 100 may be configured in the form of a thread together quick disconnect (QD) coupling. Fitting 100 may be utilized in various cooling systems, e.g., liquid cooling systems. Fitting 100 may be configured to eliminate the need to drain, refill and bleed air from a cooling system. Fitting 100 may be configured to provide a break point for connection and removal of other devices such as one or more line replaceable units (LRUs).

Fitting 100 may be configured to eliminate or reduce impurities such as air or particle inclusion during connection and disconnection. Fitting 100 may include a partial or complete axial face seal configuration. One or more rings or molded seals may be compressed and trapped in a seal groove to prevent or minimize sealing loss. Fitting 100 may be configured to provide improved pressure drop. Fitting 100 may include optimized valve arrangements. Fitting 100 may allow connection and disconnection against hydraulic lock in a closed looped circuit. Fitting 100 may be configured for connection and disconnection against higher pressures. Fitting 100 may be configured to eliminate or reduce damage to components, e.g., seals.

With embodiments, fitting 100 may be configured as a mechanical pull sleeve for reliable connection and disconnection. Fitting 100 may be configured to eliminate or minimize air inclusion during connection. Fitting 100 may be configured to eliminate or reduce fluid loss during disconnection. Fitting 100 may be configured to connect against a hydraulic lock in a closed loop circuit, e.g., of a cooling system.

Figure 11:
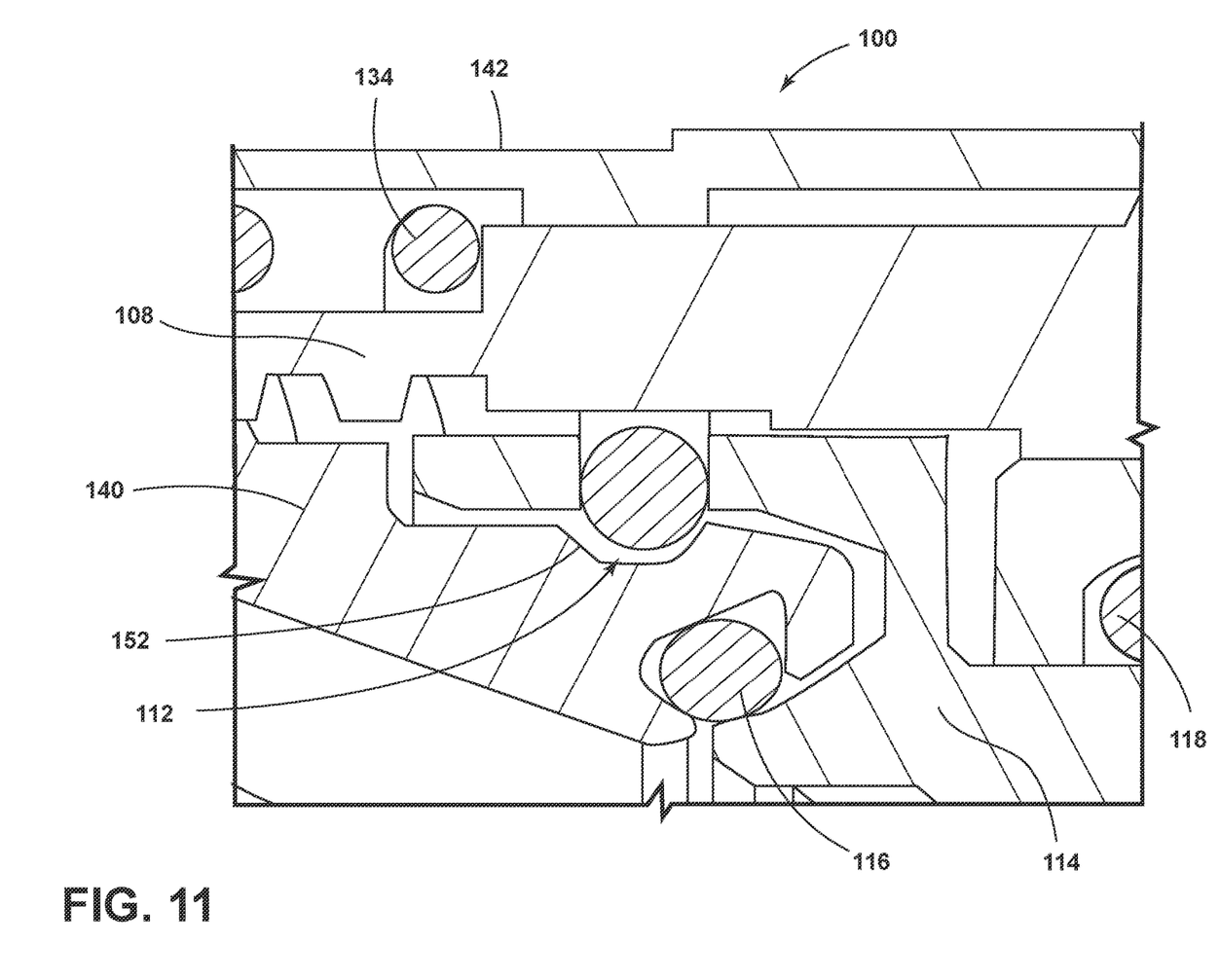
FIG. 11 is a further enhanced cross-section view of an embodiment of fitting, e.g., associated with FIG. 10.

With embodiments, such as generally illustrated in FIG. 11, fitting 100 may be configured as a pull home sleeve device. Fitting 100 may be configured to combine the structures and functions of a pull home lock having a lobe and/or ball connection along with a threaded connection between the first and second assemblies 102, 104 to reduce envelope space. Fitting 100 may include thread including a thread relief groove 150 for insertion of the first assembly 102 (e.g., as a male assembly) before or while creating the pull home lock with the valve sleeve. Retainer 112 may include one or more lobes 112a, 112b arranged, sized and/or chamfered to extend between the first and second assemblies 102, 104 and slide along a minor diameter of the threaded connection.

With embodiments, fitting 100 may be configured with ratcheting, floating lobe, threaded, and or seal connections. These connections may be relative to and/or between the first assembly 102 and the second assembly 104. One or the combination of these connections may facilitate the functions and advantages described herein.

With embodiments, such as generally illustrated in FIGS. 1, 2, 5, and 6, fitting 100 may be configured to form a threaded connection, e.g., by way of engagement between the first assembly 102 and the second assembly 104. For example and without limitation, fitting 100 (e.g., first assembly 102) may include body 140 with first threads, e.g., external threads. Fitting 100 (e.g., second assembly 104) may include nut 108 with second threads, e.g., internal threads. The first and second threads may be configured to engage each other to move the first assembly 102 and the second assembly 104 relative to each other along a longitudinal axis. This may be provided in combination with the ratchet, lobe, and seal connections as described herein.

Figure 1:
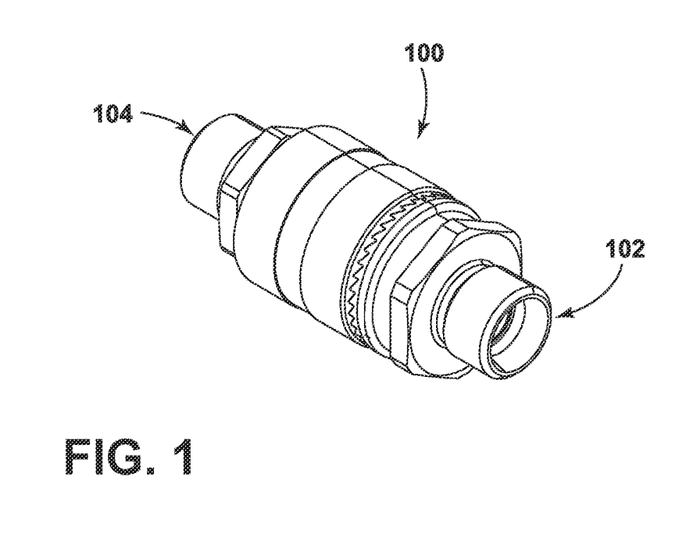
FIG. 1 is a perspective view generally illustrating an embodiment of a fluid fitting according to teachings of the present disclosure, e.g., facing a male side in a connected configuration.
Figure 2:
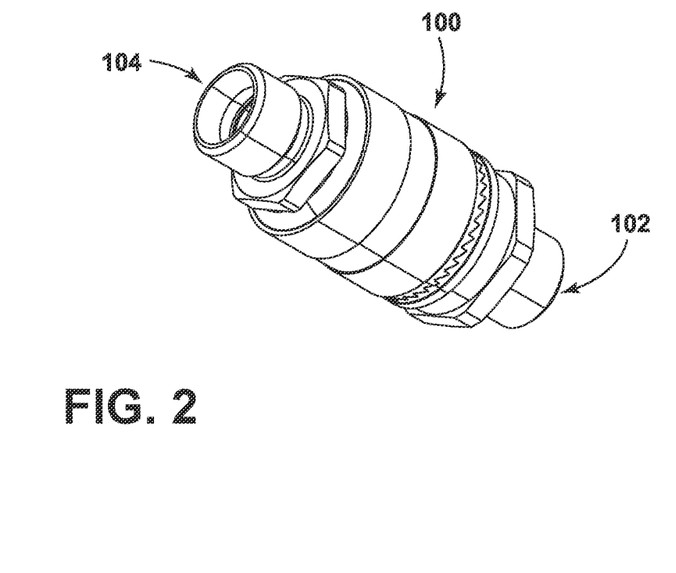
FIG. 2 is another perspective view generally illustrating an embodiment of a fluid fitting, e.g., facing a female side in a connected configuration.
Figure 3:
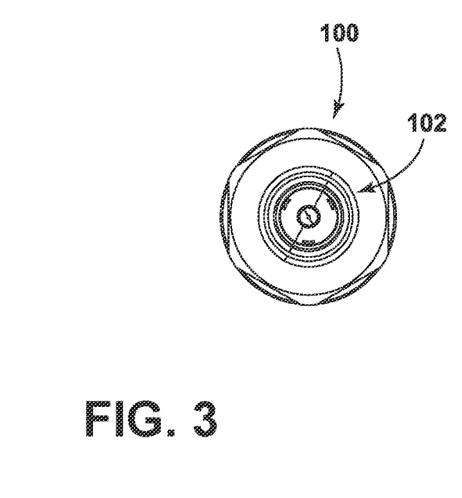
FIG. 3 is a front view generally illustrating an embodiment of a fluid fitting, e.g., facing a male side in a connected configuration.
Figure 4:
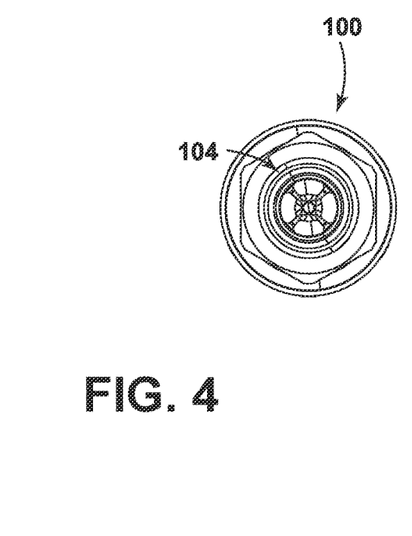
FIG. 4 is a rear view generally illustrating an embodiment of a fluid fitting, e.g., facing a female side in a connected configuration.
Figure 5:
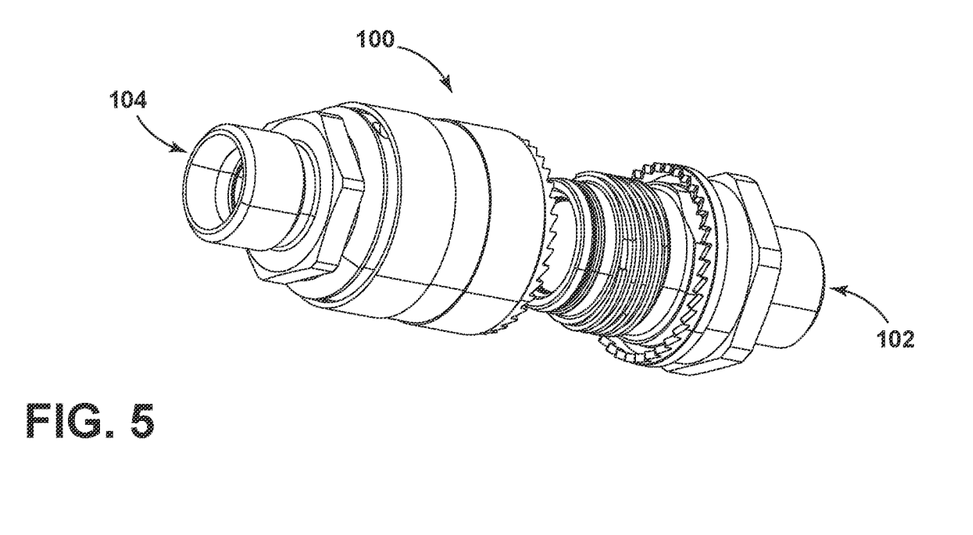
FIGS. 5-6 are perspective views of embodiments fitting, e.g., a disconnected configuration, such as that associated with FIGS. 1 and 2.
Figure 6:
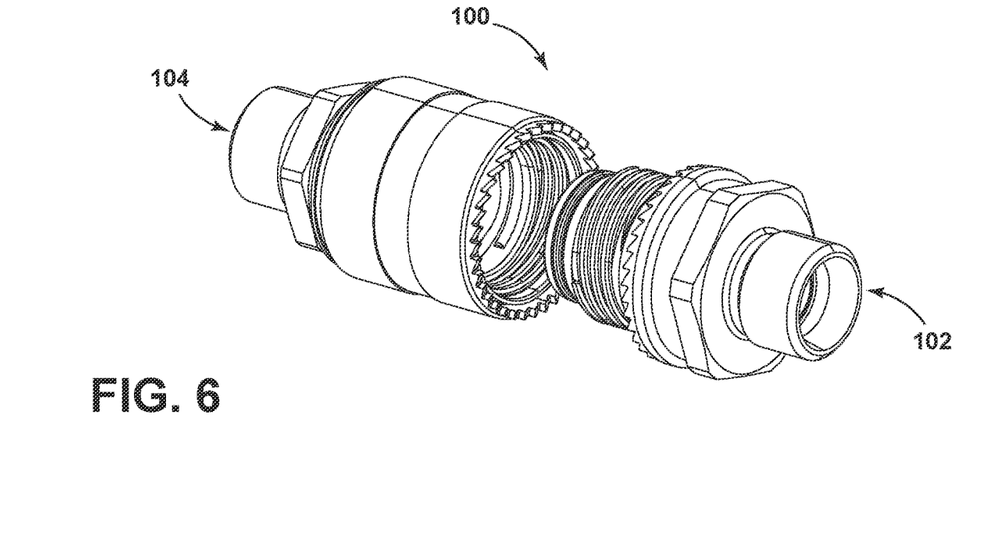
Figure 7:
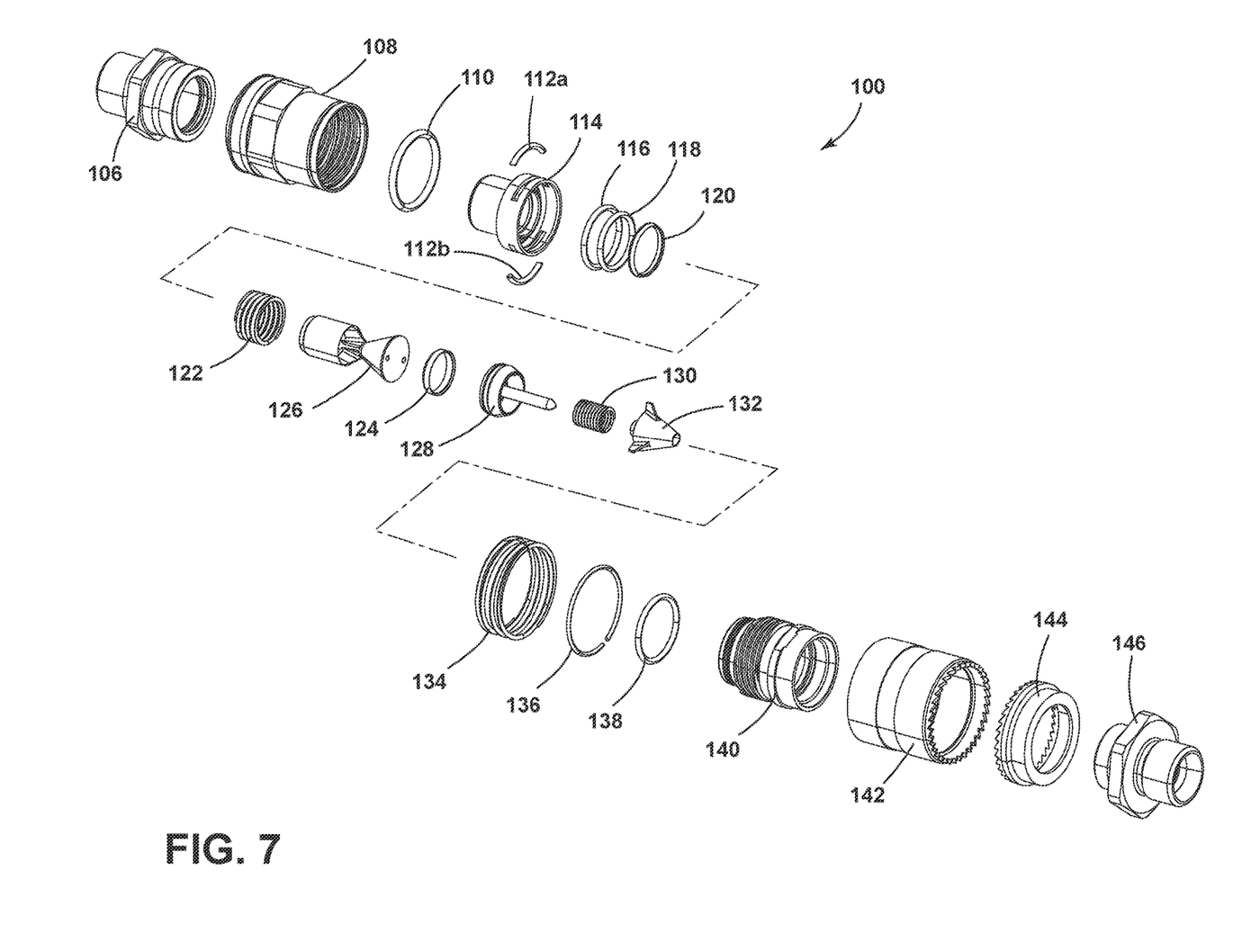
FIG. 7 is an exploded perspective view of an embodiment of fitting.

With embodiments, such as generally illustrated in FIGS. 7-9, fitting 100 may be configured to form a ratchet connection, e.g., by way of engagement between the first assembly 102 and the second assembly 104. For example and without limitation, fitting 100 (e.g., first assembly 102) may include ratchet ring 144 with first ratchet teeth 145. Fitting 100 (e.g., second assembly 104) may include locking sleeve 142 with second ratchet teeth 143. The second ratchet teeth 143 may be configured to engage the first ratchet teeth 145. In addition or as an alternative to ratchet teeth, fitting 100 may include one or more flipper locks. This may be provided in combination with the threaded, lobe, and seal connections as described herein.

With embodiments, such as generally illustrated in FIGS. 7-9, fitting 100 may be configured to form a floating lobe connection, e.g., by way of engagement between the first assembly 102 and the second assembly 104. For example and without limitation, fitting 100 (e.g., first assembly 102) may include retainer 112 with one or more floating lobes 112a, 112b. Retainer 112 having one or more floating lobes 112a, 112b may be configured to be positioned between the body 140 of the first assembly 102 and/or the nut 108 of the second assembly 104. The first and second lobes 112a, 112b may each have a semi-circular structure and are configured to be arranged in a ring configuration. The ring configuration may include the first and second lobes 112a, 112b floating and/or captured within one or more corresponding slots of valve sleeve 114. This may be provided in combination with the threaded, lobe, and seal connections as described herein.

With embodiments, such as generally illustrated in FIGS. 7-9, fitting 100 may include one or more of the seals as described herein. The systems include any of numerous seals configured to resist the passage of fluid as a gas and/or liquid from passing through the structures associated therewith. The seals may float with respect to, be received in a recess of, or be bonded to adjacent structures. For example, seals 120, 124 may include bonded seals. As another example, at least one floating lobe 112a, 112b may be configured to urge the one or more seals between and against the first assembly 102 and second assembly 104. The seals may be provided in combination with the threaded, ratchet and/or lobe connections, such as described herein.

Fitting 100 may be configured to provide a body sealed condition and a valve sealed condition. For example, the body and valve sealed conditions may be provided by any of the seals herein, e.g., a main seal (e.g., seal 116) and a valve seal (e.g., seal 124). In a body sealed condition, the main seal may be closed against any or all of the surrounding structures while the valve seal is open, e.g., to permit fluid flow through the male and female sides while they are connected.

In a valve sealed condition, the valve seal may be closed against any or all of the surrounding structures while the main seal remains open, e.g., to retain fluid to the respective male and female sides while they are disconnected.

With embodiments, such as generally illustrated in FIG. 11, fitting 100 may include a thread relief groove 150. For example and without limitation, the thread relief groove may be part of the nut 108 of the second assembly 104. The thread relief groove 150 may include a recess configured to receive retainer 112, e.g., at least one floating lobe 112a, 112b. Retainer 112 may be configured to be trapped between a minor thread diameter of the nut 108 and the body 140 to create a latch between the valve sleeve 114 and the body 140. The thread relief groove 150 may be configured urge at least one floating lobe 112a, 112b against the first assembly 102, e.g., against body 140 in a radially inward direction and/or in a first longitudinal direction toward to the first assembly 102.

With embodiments, fitting 100 may include a lobe groove 152. For example and without limitation, the lobe groove 152 may be configured to receive the at least one floating lobe 112a, 112b. The lobe groove 152 may be configured to urge the at least one floating lobe 112a, 112b against the second assembly 104, e.g., against nut in a radially outward direction and/or in a second longitudinal direction toward the second assembly 104

Figure 12:
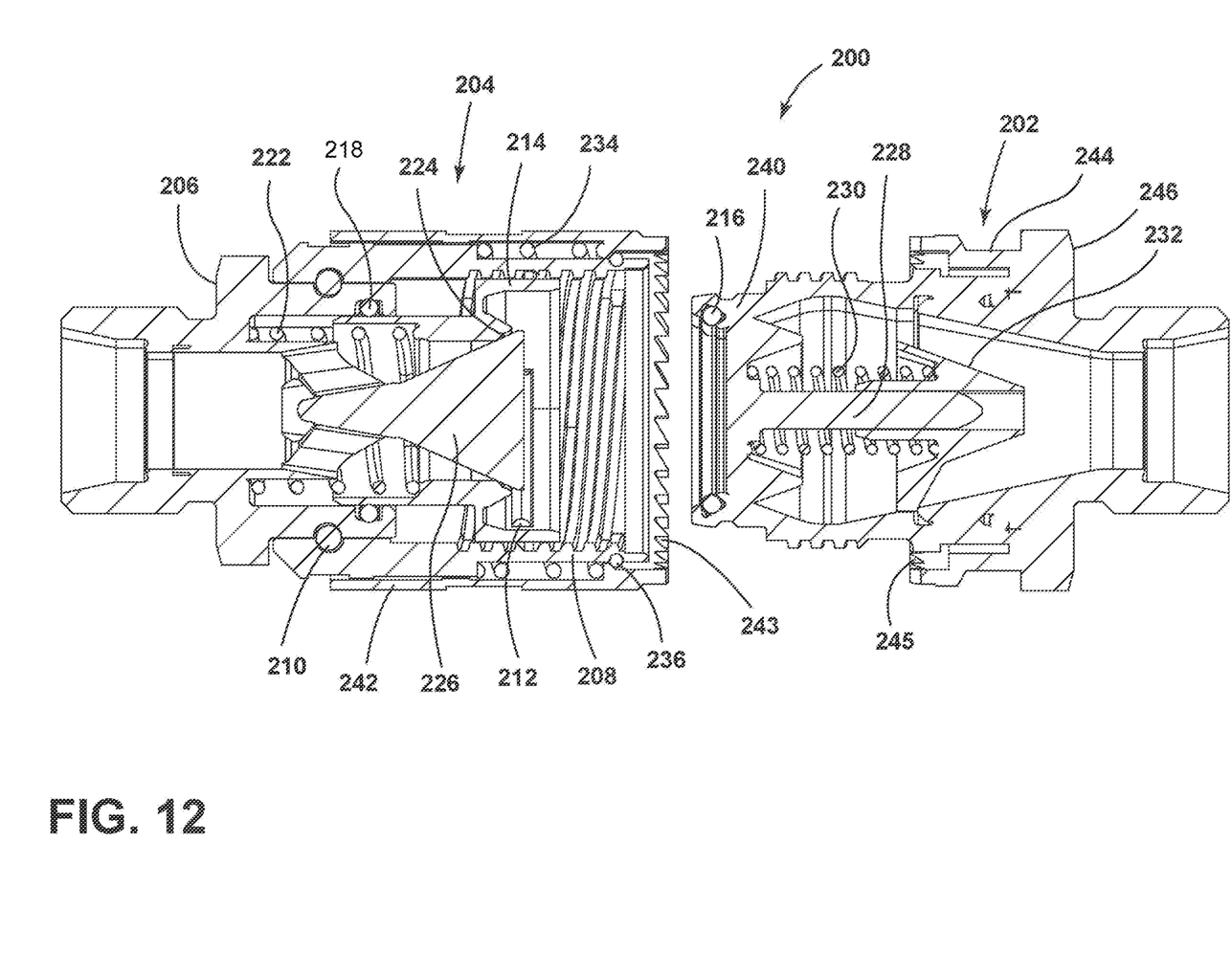
FIG. 12 is a cross section view of an embodiment of a fluid fitting according to teachings of the present disclosure, shown in a disconnected configuration.
Figure 13:
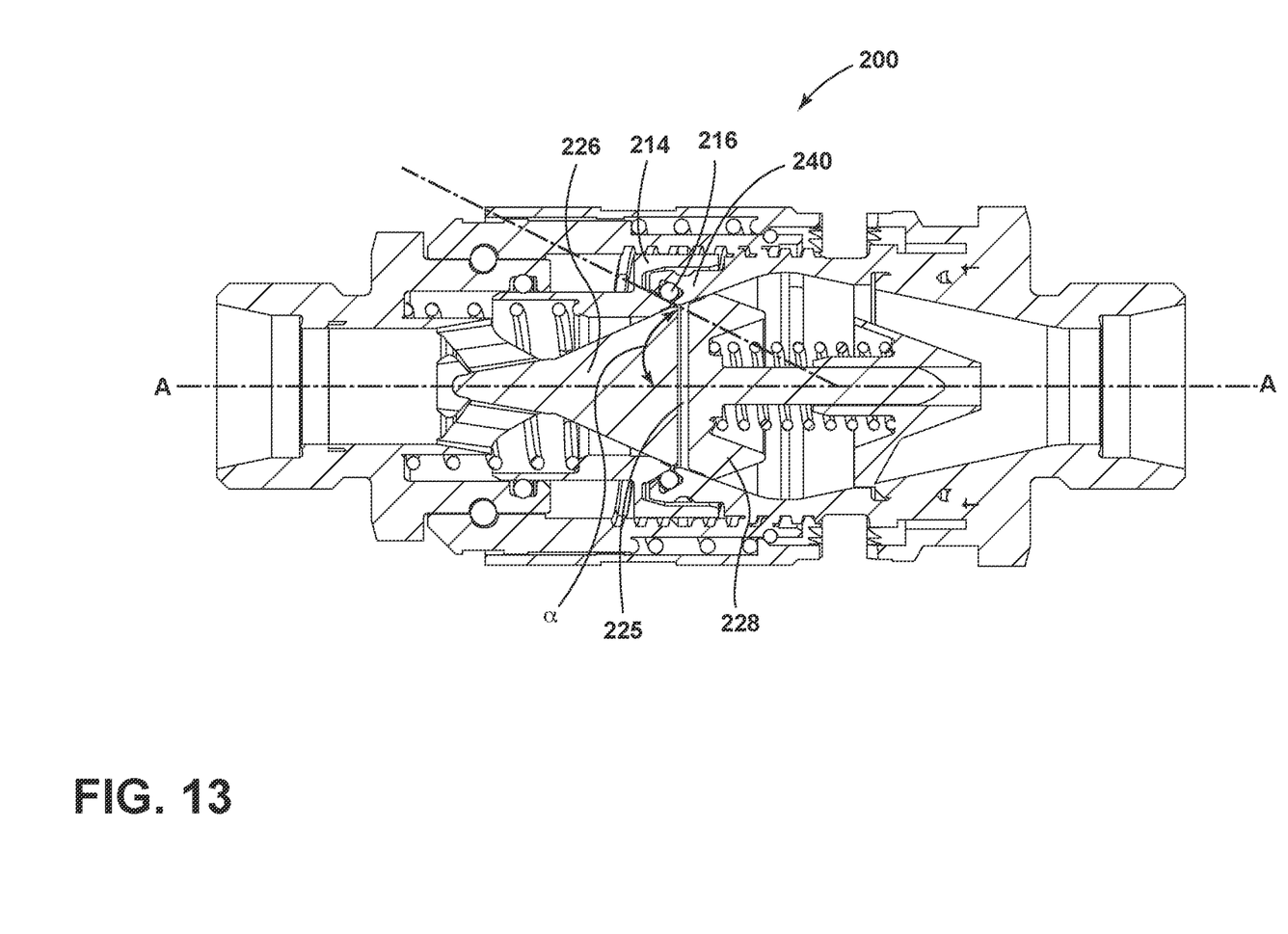
FIG. 13 is a cross section view of an embodiment of a fluid fitting according to teachings of the present disclosure, similar to that of FIG. 12 and shown in a connecting configuration.
Figure 14:
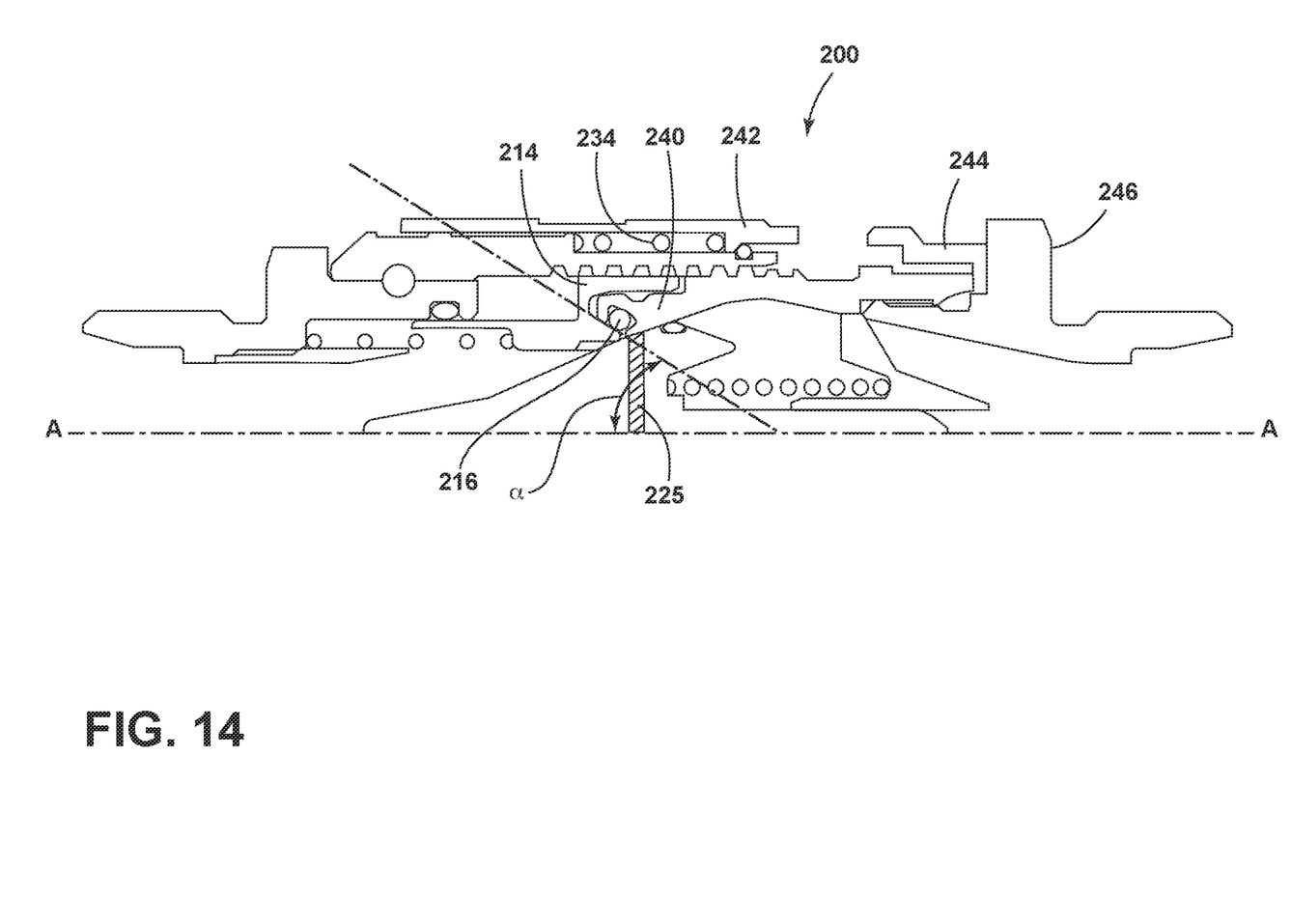
FIG. 14 is a cross section illustration of an embodiment of a connected fluid fitting according to teachings of the present disclosure, although shown in a reverse orientation as that generally depicted in FIGS. 12 and 13.

Additionally, with embodiments, an inclusion of an angled sealing surface, such as generally illustrated in FIGS. 12-14, can be employed. The incorporation of such an angled sealing surface can, among other things, serve to significantly reduce associated air inclusion. FIGS. 12 and 13, generally show an embodiment of a fitting 200 shown in a disconnected and a partial connecting configuration, respectively. FIG. 14 generally illustrates a cross section of an embodiment of a partially connected fluid fitting, although shown in a reverse orientation as that generally depicted in FIGS. 12 and 13.

As generally illustrated in FIGS. 12 and 13, fitting 200 may include—inter alia, and with many similar/corresponding components as illustrated fitting 100 (although numbered instead in the 200 series as opposed to 100 series)—an adapter 206, nut 208, wire 210, retainer 212, valve sleeve 214, seal 216 (e.g., main seal), seal 218 (e.g., adapter and/or valve sleeve seal), spring 222 (e.g., valve sleeve spring), valve 226, poppet valve 228, poppet spring 230, guide 232, release sleeve spring 234, ring 236, body 240, locking sleeve 242, ratchet ring 244, and adapter 246. Any or all of these components may generally be interchangeable between the first assembly 202, second assembly 204, or one or more additional assemblies.

With reference to the embodiment generally illustrated in FIG. 13, a body 240 is shown in connection with a sleeve 214 that is spring loaded. When the body 240 pushes the sleeve 214 (in the longitudinal direction to the left in the instant figure), a valve seal 224 will lose contact, and create a flow path. With such an embodiment, an associated sealing surface angle α (which is relative to the longitudinal axis of the fitting, see, e.g., longitudinal axis A in FIG. 14) will reduce the volume of air inclusion provided within a volume or space 225 disposed between a valve 226 and poppet valve 228. With embodiments such as illustrated, during connection, the first one or two threads can be started to engage before the seal 216 (which may comprise an O-ring) contacts and seals of against the mating surface of sleeve 214. During such connection, there is at least some biasing resistance of the components provided by associated springs (i.e., as the springs are being compressed). Additionally, there can be some bootstrap pressure (e.g., 50-60 psi, for example, with a hydraulic system) on both sides of the flow path that may also need to be overcome with the connection. However, the threaded connection can, among other things, provide a mechanical advantage to bring the relevant flow paths together. Typically, with embodiments, it is desirable to form a sealing with a seal associated with sleeve 214 before either flow path associated with the valves is opened. With embodiments, a seal 216 may stick out of the associate recess to some degree (i.e., in a free state) prior to the seal 216 making contact with the relevant contact portion of the sleeve 214 with the connection for the fitting 200. With embodiments, it is desired that there will be at least a certain amount of "squeeze" (e.g., via having the sleeve travel an additional minimum longitudinal travel of about 8 thousandths of an inch if the sealing surface angle α is about 90°) applied to the seal 216. A proper or desirable amount of squeeze with the connection can, inter alia, serve to provide a sufficient or desirable sealing between the associated components. The direction of the squeeze of the seal 216 will typically be in the direction perpendicular to the sealing surface angle α. The amount of squeeze associated with other sealing surface angles α can be mathematically calculated based on trigonometric calculations. In embodiments, sealing surface angle α may range from, for example and without limitation, about 15° up to about 90° (i.e., with 90° essentially equating to a face seal). Moreover, the sealing surface angles α and the amount of associated squeeze may be adjusted or coordinated (e.g., "tuned") as desired for various fitting embodiments and/or applications.

So, with respect to the squeeze of the seal 216 going from just touching to the extent of the squeeze (e.g., the squeeze associated with the 8 thousandths of an inch of travel—calculated in the axial direction component), that generally corresponds to the amount of air that is going to be trapped. Moreover, there may be a baseline gap provided between valves 226, 228 to accommodate associated tolerances. Such a baseline gap may also add to a total air inclusion volume.

With embodiments, it may not be desirable to include too shallow of a sealing surface angle α. Among other things, too shallow of a sealing surface angle α may result in or require increased or an increasingly significant air inclusion. With some embodiments, a sealing surface angle α may range from about 15° up to about 90° (wherein 90° may work for some low pressure applications and may be an optimum for the reduction of associated air inclusion). For some applications, a sealing surface angle α may range from about 30° up to about 60°. Further, with some embodiments the sealing surface angle α may be about 30° or the sealing surface angle α may be at least 30° (and less than 90°). Generally, the greater the sealing surface angle α, the lower an amount of additional "squeeze," i.e., additional longitudinal travel, that will be desired or necessary following first contact of the seal components and trapping of air. For example, with a sealing surface angle α of 30°, the amount of additional added longitudinal travel for the intended amount of squeeze effect may be about 0.016 of an inch; while, in comparison, for a sealing surface angle α of about 90°, the amount of additional added longitudinal travel for the squeeze may be about 0.008 of an inch—i.e., about half of the additional amount of longitudinal travel. Moreover, for most embodiments, the fitting 200 will be intended for low pressure systems (as that term is known in the industry for such fittings and applications), which might for example and without limitation, be about 150 psi.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, operations, components, and elements that are readily understood by an artisan have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in one or more embodiments. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A fluid coupling comprising:
   a first assembly including first ratchet teeth and a body with external threads;
   a second assembly including second ratchet teeth and a nut with internal threads, the second ratchet teeth configured to engage the first ratchet teeth, and the internal threads configured to engage the external threads; and
   a retainer having at least one floating lobe configured to provide retention between the first assembly and the second assembly, wherein the floating lobe is configured to move into retained engagement between the first and second assemblies as the internal and external threads are threaded together, and wherein the nut includes a thread relief groove with a recess configured to receive the at least one floating lobe.

2. The fluid coupling of claim 1, wherein the at least one floating lobe includes first and second lobes.

3. The fluid coupling of claim 2, wherein the first and second lobes each have a semi-circular structure and are configured to be arranged in a ring configuration.

4. The fluid coupling of claim 1, further comprising a main seal connecting the first and second assembly, the main seal sealing against a sealing surface of a valve sleeve in response to the threading, and the first and second assemblies being held against each other by a compression spring force of the valve sleeve as the valve sleeve opens during the connection of the first and second assembly.

5. The fluid coupling of claim 1, further comprising a valve sleeve and a valve spring with a spring force, wherein, in response to advancing the threading, the fluid coupling is configured to provide a sealed condition by urging at least one of a body seal, valve sleeve and adjacent surfaces of at least one the first and second assembly relative to the spring force to urge the valve sleeve and body seal to provide the sealed condition between the first and second assembly, wherein a main seal between the first and second assembly is made prior to opening the valve sleeve and a poppet valve in the respective portions of the first and second assembly.

6. The fluid coupling of claim 5, wherein, in response to retracting the threading, the fluid coupling is configured to provide a disconnected sealed condition by trapping the retainer between an inner threads minor diameter and a body groove to form a latch between the valve sleeve and the body.

7. The fluid coupling of claim 6, wherein, in response to retracting the threading, the fluid coupling is configured to provide an unsealed condition between the first and second assembly and provide the disconnected sealed condition by urging the retainer to separate into a first portion and a second portion.

8. The fluid coupling of claim 7, wherein, in response to at least one of retracting the threading and separating the retainer, the latch between the body and valve sleeve is configured to urge the valve sleeve and a bonded seal toward the valve to seal a female portion in a disconnected position.

9. The fluid coupling of claim 1, wherein the retainer is configured to move radially out of a body groove and disengage a latch in response to the retainer reaching a thread relief groove.

10. The fluid coupling of claim 1, wherein the body includes a groove configured to receive the at least one floating lobe and urge the at least one floating lobe against the nut.

11. The fluid coupling of claim 1, wherein the second assembly includes a valve sleeve; a seal is disposed between the body and the valve sleeve; and, upon a sealing connection of the first assembly and the second assembly, a sealing surface angle, relative to a longitudinal axis of the coupling, is provided along a surface length between a portion of the body and a corresponding portion of the valve sleeve.

12. The fluid coupling of claim 11, wherein the sealing surface angle relative to the longitudinal axis is 90° or less.

13. The fluid coupling of claim 11, wherein the sealing surface angle relative to the longitudinal axis ranges from 15° to 90°.

14. The fluid coupling of claim 11, wherein the sealing surface angle relative to the longitudinal axis ranges from 30° to 60°.

15. The fluid coupling of claim 11, wherein the sealing surface angle relative to the longitudinal axis is 30°.

16. The fluid coupling of claim 11, wherein the sealing surface angle relative to the longitudinal axis is greater than 30°.

17. A fluid coupling comprising:
a first assembly including a body with external threads;
a second assembly including a nut with internal threads, the internal threads configured to engage the external threads; and
a retainer having at least one floating member configured to provide retention between the first assembly and the second assembly, wherein the floating member is configured to move into retained engagement between the first and second assemblies as the internal and external threads are threaded together;
wherein the second assembly includes a valve sleeve; a seal is disposed between the body and the valve sleeve; and, upon a sealing connection of the first assembly and the second assembly, a sealing surface angle, relative to a longitudinal axis of the coupling, is provided along a surface length between a portion of the body and a corresponding portion of the valve sleeve, wherein the valve sleeve is configured to capture the at least one floating member.

18. The fluid coupling of claim 17, wherein the sealing surface angle relative to the longitudinal axis ranges from 15° to 90°.

19. A fluid coupling comprising:
a first assembly including a body with external threads;
a second assembly including a nut with internal threads configured to engage the external threads; and
a retainer having at least one floating member configured to provide retention between the first assembly and the second assembly;
wherein the first assembly and the second assembly are configured to be moved between a coupled state and a de-coupled state, wherein a valve arrangement of the fluid coupling opens as the first and second assembles are moved from the de-coupled state to the coupled state to provide a fluid path through the fluid coupling, wherein the internal and external threads and the at least one floating member cooperate to retain the first and second assemblies in the coupled state, and wherein the at least one floating member moves to an engaged position between the first and second assemblies as the internal and external threads are threaded together, wherein a relief groove is defined within at least one of the internal and external threads, and wherein the at least one floating member is configured to move radially into the relief groove to provide clearance for allowing the at least one floating member to move to the engaged positioned as the internal and external threads are threaded together.

20. The fluid coupling of claim 19, wherein the relief groove is defined within the internal thread, wherein the body defines a retention groove in which the at least one floating member is positioned when the at least one floating member is in the engaged position, wherein the at least one floating member is pushed radially into the relief groove by a cam surface of the body as the internal and external threads are threaded together, wherein the at least one floating member moves from the relief groove into the retention groove when the retention groove aligns with the relief groove during threading of the internal and external threads, and wherein an inner diameter of the internal thread retains the at least one floating member in the retention groove upon continued threading of the external and internal threads after the at least one floating member has moved into the retention groove.

21. A fluid coupling comprising:
a first assembly including a body with external threads;
a second assembly including a nut with internal threads configured to engage the external threads; and
a retainer having at least one floating member configured to provide retention between the first assembly and the second assembly;
wherein the first assembly and the second assembly are configured to be moved between a coupled state and a de-coupled state, wherein a valve arrangement of the fluid coupling opens as the first and second assembles are moved from the de-coupled state to the coupled state to provide a fluid path through the fluid coupling, wherein the internal and external threads and the at least one floating member cooperate to retain the first and second assemblies in the coupled state, and wherein the at least one floating member moves to an engaged position between the first and second assemblies as the internal and external threads are threaded together, wherein the second assembly includes a valve sleeve positioned within the nut, wherein at least one floating member is captured within the valve sleeve, wherein the valve sleeve is axially moveable relative to the nut between an open position in fluid communication is open through the second assembly and a closed position in which fluid communication is closed through the second assembly, wherein the valve sleeve is spring biased toward the closed position, wherein the body defines a retention groove for receiving the at least one floating member when the internal and external threads are threaded together, wherein when the at least one floating member is in the engaged position the at least one floating member provides engagement between the body and the valve sleeve such that continued threading of the internal and external threads causes the body to move the valve sleeve from the closed position to the open position.

22. The fluid coupling of claim 21, wherein the first assembly includes a spring-biased poppet for opening and closing fluid communication through the first assembly, wherein the valve arrangement is configured such that the poppet moves axially relative to the body against the spring bias to open fluid communication through the first assembly when the first and second assemblies are moved from the de-coupled state to the coupled state.

23. The fluid coupling of claim 22, wherein the first assembly includes a ring outside the body having first ratchet teeth, wherein the second assembly includes a spring-biased locking sleeve outside the nut having second ratchet teeth, and wherein the first and second ratchet teeth interlock when the first and second assemblies are in the coupled state.

24. A fluid coupling comprising:
a first assembly including first ratchet teeth and a body with external threads;
a second assembly including second ratchet teeth and a nut with internal threads, the second ratchet teeth configured to engage the first ratchet teeth, and the internal threads configured to engage the external threads; and
a retainer having at least one floating lobe configured to provide retention between the first assembly and the second assembly, wherein the at least one floating lobe includes first and second lobes, and wherein the first and second lobes each have a semi-circular structure and are configured to be arranged in a ring configuration.

25. A fluid coupling comprising:
a first assembly including first ratchet teeth and a body with external threads;
a second assembly including second ratchet teeth and a nut with internal threads, the second ratchet teeth configured to engage the first ratchet teeth, and the internal threads configured to engage the external threads;
a retainer having at least one floating lobe configured to provide retention between the first assembly and the second assembly; and
a main seal connecting the first and second assembly, the main seal sealing against a sealing surface of a valve sleeve in response to the threading, and the first and second assemblies being held against each other by a compression spring force of the valve sleeve as the valve sleeve opens during the connection of the first and second assembly.

26. A fluid coupling comprising:
a first assembly including first ratchet teeth and a body with external threads;
a second assembly including second ratchet teeth and a nut with internal threads, the second ratchet teeth configured to engage the first ratchet teeth, and the internal threads configured to engage the external threads;
a retainer having at least one floating lobe configured to provide retention between the first assembly and the second assembly; and
a valve sleeve and a valve spring with a spring force, wherein, in response to advancing the threading, the fluid coupling is configured to provide a sealed condition by urging at least one of a body seal, the valve sleeve and adjacent surfaces of at least one the first and second assembly relative to the spring force to urge the valve sleeve and the body seal to provide the sealed condition between the first and second assembly, wherein a main seal between the first and second assembly is made prior to opening the valve sleeve and a poppet valve in the respective portions of the first and second assembly.

27. The fluid coupling of claim 26, wherein, in response to retracting the threading, the fluid coupling is configured to provide a disconnected sealed condition by trapping the retainer between an inner threads minor diameter and a body groove to form a latch between the valve sleeve and the body.

28. The fluid coupling of claim 27, wherein, in response to retracting the threading, the fluid coupling is configured to provide an unsealed condition between the first and second assembly and provide the disconnected sealed condition by urging the retainer to separate into a first portion and a second portion.

29. The fluid coupling of claim 28, wherein, in response to at least one of retracting the threading and separating the retainer, the latch between the body and valve sleeve is configured to urge the valve sleeve and a bonded seal toward the valve to seal a female portion in a disconnected position.

30. A fluid coupling comprising:
a first assembly including first ratchet teeth and a body with external threads;
a second assembly including second ratchet teeth and a nut with internal threads, the second ratchet teeth configured to engage the first ratchet teeth, and the internal threads configured to engage the external threads; and
a retainer having at least one floating lobe configured to provide retention between the first assembly and the second assembly, wherein the body includes a groove configured to receive the at least one floating lobe and urge the at least one floating lobe against the nut.

31. A fluid coupling comprising:
a first assembly including first ratchet teeth and a body with external threads;
a second assembly including second ratchet teeth and a nut with internal threads, the second ratchet teeth configured to engage the first ratchet teeth, and the internal threads configured to engage the external threads; and
a retainer having at least one floating lobe configured to provide retention between the first assembly and the second assembly, wherein the second assembly includes a valve sleeve; wherein a seal is disposed between the body and the valve sleeve; and, wherein upon a sealing connection of the first assembly and the second assembly, a sealing surface angle, relative to a longitudinal axis of the coupling, is provided along a surface length between a portion of the body and a corresponding portion of the valve sleeve.

32. The fluid coupling of claim 31, wherein the sealing surface angle relative to the longitudinal axis ranges from 15° to 90°.

* * * * *